(12) United States Patent
Banks

(10) Patent No.: US 12,410,591 B1
(45) Date of Patent: Sep. 9, 2025

(54) HOUSING FOR DRAIN OUTLET

(71) Applicant: Douglas W. Banks, Hurdle Mills, NC (US)

(72) Inventor: Douglas W. Banks, Hurdle Mills, NC (US)

( * ) Notice: Subject to any disclaimer, the term of this patent is extended or adjusted under 35 U.S.C. 154(b) by 0 days.

(21) Appl. No.: 18/759,079

(22) Filed: Jun. 28, 2024

(51) Int. Cl.
*E03B 7/12* (2006.01)
*E03B 7/09* (2006.01)

(52) U.S. Cl.
CPC ............... *E03B 7/12* (2013.01); *E03B 7/095* (2013.01)

(58) Field of Classification Search
CPC . E03B 7/095; E03B 7/12; E03B 9/027; F24H 15/136; F16K 27/12; Y10T 137/6606
See application file for complete search history.

(56) References Cited

U.S. PATENT DOCUMENTS

| | | |
|---|---|---|
| 2,650,180 A | 8/1953 | Walker |
| 2,990,846 A | 7/1961 | Rives |
| 3,570,809 A | 3/1971 | Stuy |
| 3,858,632 A | 1/1975 | Stout |
| 3,981,153 A | 9/1976 | Bleek |
| 4,380,245 A | 4/1983 | Hefner |
| 4,890,638 A | 1/1990 | Davenport |
| 5,614,119 A | 3/1997 | Ollis |
| 5,875,812 A | 3/1999 | Miller |
| 6,173,733 B1 | 1/2001 | Pruitt et al. |
| 6,206,030 B1 | 3/2001 | Barthuly |
| 6,889,394 B2 | 5/2005 | Guillen |
| 7,849,873 B2* | 12/2010 | Hiratsuka ............... F16K 49/00 137/341 |
| 8,511,336 B1 | 8/2013 | Schumacher |
| 9,469,976 B1 | 10/2016 | Banks |
| 11,359,358 B1* | 6/2022 | Timms ................... E03B 9/025 |
| 12,163,317 B1* | 12/2024 | Ware ........................ E03B 7/12 |
| 2005/0247009 A1 | 11/2005 | Vagedes |
| 2006/0042694 A1 | 3/2006 | Reineck |
| 2007/0272305 A1 | 11/2007 | Schumacher |
| 2013/0327761 A1 | 12/2013 | Warmuth |
| 2014/0263343 A1 | 9/2014 | Geerligs et al. |
| 2016/0281339 A1 | 9/2016 | Banks |
| 2020/0378513 A1* | 12/2020 | Kowalski ................ F16K 27/12 |

FOREIGN PATENT DOCUMENTS

| | | |
|---|---|---|
| DE | 29708757 | 12/1997 |
| FR | 2663060 | 12/1991 |
| FR | 2664961 | 1/1992 |
| JP | 2006316559 | 11/2006 |
| JP | 2007197919 | 8/2007 |
| KR | 101194416 | 10/2012 |

* cited by examiner

*Primary Examiner* — Reinaldo Sanchez-Medina
(74) *Attorney, Agent, or Firm* — Taylor Duma LLP

(57) ABSTRACT

An apparatus is provided for protecting from freezing fluid flowing from a conduit outlet of a condensing gas furnace above ground level on an exterior wall of a building. The freeze protection apparatus comprises a heater box disposed within a housing, including thermal insulating material lining the interior surface of walls of the housing. A thermostatically controlled heater is mounted to the heater box for maintaining the interior chamber above freezing temperature to prevent condensate fluid from freezing. Means are provided for mounting the housing to structure adjacent the conduit outlet. Heat is retained within the housing to prevent condensate fluid within the conduit outlet from freezing.

16 Claims, 16 Drawing Sheets

HOUSING FOR DRAIN OUTLET

BACKGROUND

This invention relates generally to a housing for a termination point of a drain line outlet associated with all central heating and air conditioning systems. The housing is also configured to accommodate the traps on all condensing furnaces, as well as a condensate pump that mechanically expels liquid condensate when required. More particularly, the housing or enclosure is heated for use with a condensing gas furnace is those areas where the condensate is susceptible to freezing.

Condensing gas furnaces are gas-fired furnaces having annual fuel efficiency ratings of 90% or above. Due to the nature of their twin heat exchanger design and ultra-high efficiency ratings, condensing furnaces can produce three to seven gallons of condensate fluid daily during a heat cycle. Moreover, the condensing furnace traps require condensate pumps when the furnace is situated below grade elevations. Condensate drain outlets are all necessary components for expelling condensate liquid produced by the furnace to an exterior location beyond the home or structure's perimeter. However, during extremely cold weather conditions, the condensate fluid is prone to freezing at the traps, the condensate pump, or the drain outlets. Windy conditions significantly contribute to increased chill factors that cause condensate freezing at the exterior drain outlet termination points. The condensate traps condensate pumps both have differed size reservoirs that hold small quantities of standing condensate fluid which is especially susceptible to freezing in frigid conditions in and around the furnace locations, such as below grade basements or crawlspaces.

Once condensate fluid freezes at any location, sensitive fail-safe devices on the furnaces immediately shut the furnace off, resulting in a "no-heat" scenario. This situation typically requires a service call and a technician to come out, verify which component is frozen, and then subsequently thaw the frozen components. Unfortunately, this is a temporary fix as the drain line components may freeze again depending upon the ambient conditions, leaving the home's occupants with no-heat when they need it the most.

Applicant is the owner of U.S. Pat. No. 9,469,976, entitled Housing For Drain Outlet, which describes a solution to prevent freezing of the condensate at the drain outlet termination point. The contents of U.S. Pat. No. 9,469,976, are incorporated herein by reference in the entirety. The '976 patent describes an apparatus for protecting condensate fluid from a condensing gas furnace from freezing at an above-ground conduit outlet on an exterior wall of a home or building. The freeze protection apparatus comprises a housing adapted for covering the conduit outlet. The housing includes a top wall, a front wall, and a pair of opposed side walls interconnecting the top wall and the front wall. The housing partially defines an enclosed area having a rear aperture and a bottom aperture. Thermal foam insulating panel material lines the interior surface of the walls of the housing. Means are provided for mounting the housing to the exterior wall, fully encompassing the conduit outlet. The inner edges of the side walls and the top wall contact the exterior wall, and the bottom edges of the side walls and the front wall contact the ground below the conduit outlet for enclosing the conduit outlet within an enclosed space defined by the housing, exterior wall and the ground. Heat is retained within the housing to prevent fluid within the conduit from freezing. The patented freeze protection apparatus has proven to be a valuable asset as the use of condensing gas furnaces continues to grow and will be mandated by the Department of Energy in January 2029. Thus, the problem of condensate fluid freezing will become more prevalent, especially in consistently colder environments.

For the foregoing reasons, a freeze protection apparatus is needed for condensing gas furnace drainage components. Ideally, the freeze protection apparatus will include a housing to prevent freezing of the condensate fluid exiting the furnace at any location. The new housing should be equipped with an auxiliary heat component to prevent freezing in particularly cold environments. Ideally, the housing will allow for relatively quick and easy installation or replacement.

SUMMARY

An apparatus is provided for protecting from freezing fluid flowing from a conduit outlet above ground level on an exterior wall of a building. The freeze protection apparatus comprises a condensing gas furnace providing a continuous flow of condensate fluid through the conduit outlet. A heater box has a longitudinal dimension and includes a top wall, a front wall and a plurality of side walls interconnecting the top wall and the front wall. The heater box partially defines an enclosed area sized for covering the conduit outlet and having a rear aperture and a bottom aperture. A housing is adapted for receiving the heater box. The housing includes a top wall having an interior surface and an inner edge, a front wall having an interior surface, a bottom edge, and a lateral dimension, and a pair of opposed side walls each side wall having an interior surface, an inner edge, a bottom edge and a depth dimension. The side walls interconnect the top wall and the front wall. The housing has a longitudinal dimension greater than the longitudinal dimension of the heater box and partially defines an enclosed area having openings at a rear aperture for passing the heater box. Thermal insulating material lines the interior surface of the walls of the housing. A thermostatically controlled heater mounted to the heater box maintains the interior chamber above freezing temperature to prevent fluid from freezing. Means are provided for mounting the housing to the exterior wall adjacent the conduit outlet. Heat is retained within the heater box to prevent fluid within the conduit from freezing.

In one aspect, the freeze protection apparatus may further comprise a bottom wall spanning the side walls and the front wall inwardly longitudinally spaced from distal edges of the side walls and the front wall. The bottom wall may be perforated to allow fluid to pass through.

In another aspect, the electric heater comprises a silicone pad heater.

In use, the inner edges of the side walls and the top wall of the housing contact the exterior wall. The bottom edges of the side walls and the front wall may also contact the ground at ground level below the conduit outlet for enclosing the conduit outlet within the enclosed area defined by the heater box, the exterior wall and the ground level.

In one embodiment, the mounting means comprises flanges at the inner edges of the side wall and the top wall of the housing. In another embodiment, the mounting means comprises a hinge for hingedly securing the housing to the exterior wall for pivoting movement between an open position away from the conduit outlet and a closed position enclosing the conduit outlet. In one aspect, the pivot axis of the housing is about a substantially horizontal axis.

An apparatus is also for protecting from freezing fluid flowing from a condensing gas furnace providing a continuous flow of condensate fluid through a trap. The freeze protection apparatus comprises a heater box having a longitudinal dimension. The heater box includes a top wall, a front wall, and a plurality of side walls interconnecting the top wall and the front wall. The heater box partially defines an enclosed area and has a rear aperture and a bottom aperture for receiving the trap into the enclosed area. A housing receives the heater box, the housing including a top wall having an interior surface and an inner edge, a front wall having an interior surface, a bottom edge and a lateral dimension, and a plurality of side walls, each side wall having an interior surface, an inner edge, a bottom edge and a depth dimension. The side walls interconnect the top wall and the front wall such that the housing partially defines an enclosed area having openings at a rear aperture and a bottom aperture. The area of the bottom aperture defined by the lateral dimension of the front wall and the depth dimension of the side walls is configured for receiving the heater box. A thermal insulating material lines the interior surface of the walls of the housing. A thermostatically controlled electric heater is mounted to the heater box for maintaining the temperature of the enclosed area above freezing temperature to prevent the condensate fluid from freezing. Means are provided for mounting the housing to the furnace adjacent the trap. The inner edges of the side walls and the top wall of the housing contact the furnace for enclosing the trap within an enclosed space defined by the heater box. Heat is retained within the heater box to prevent the condensate fluid from freezing.

In one aspect, the freeze protection apparatus may further comprise a bottom wall spanning the side walls and the front wall inwardly longitudinally spaced from distal edges of the side walls and the front wall. The bottom wall may be perforated to allow fluid to pass through.

In another aspect, the electric heater comprises a silicone pad heater.

In one embodiment, the mounting means comprises flanges at the inner edges of the side wall and the top wall of the housing. In another embodiment, the mounting means comprises a hinge for hingedly securing the housing to the exterior wall for pivoting movement between an open position away from the conduit outlet and a closed position enclosing the conduit outlet. In one aspect, the pivot axis of the housing is about a substantially horizontal axis.

Yet another apparatus is provided for protecting from freezing fluid flowing from a condensate pump in a condensing gas furnace providing a continuous flow of condensate fluid. The freeze protection apparatus comprises a first pan having a depth and a longitudinal dimension, the first pan configured for receiving the condensate pump. A second pan has a depth and a longitudinal dimension greater than the longitudinal dimension of the first pan for receiving the first pan. A thermostatically controlled electric heater is mounted to the second pan for maintaining condensate fluid in the first pan and the second pan above freezing temperature to prevent the fluid from freezing. In one embodiment, the electric heater comprises a silicone pad heater.

In one aspect, the freeze protection apparatus further comprises outwardly depending flanges at the upper edges of the first pan for suspending the first pan in the second pan.

BRIEF DESCRIPTION OF THE DRAWINGS

For a more complete understanding of the present invention, reference should now be had to the embodiments shown in the accompanying drawings and described below. In the drawings.

DESCRIPTION

Figure 1:
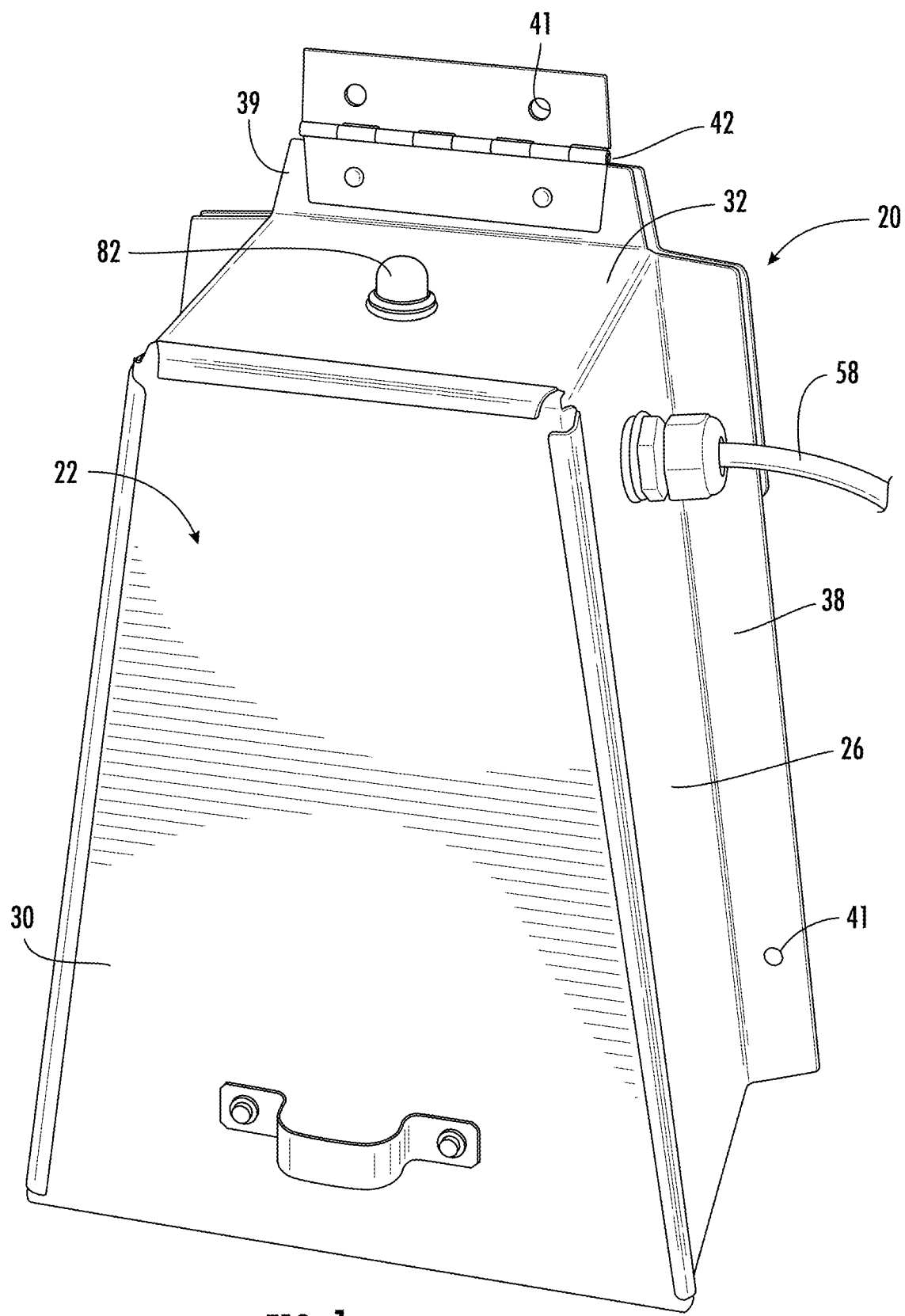
FIG. 1 is a front perspective view of an embodiment of a housing with auxiliary heat for accommodating a drain outlet.
Figure 2:
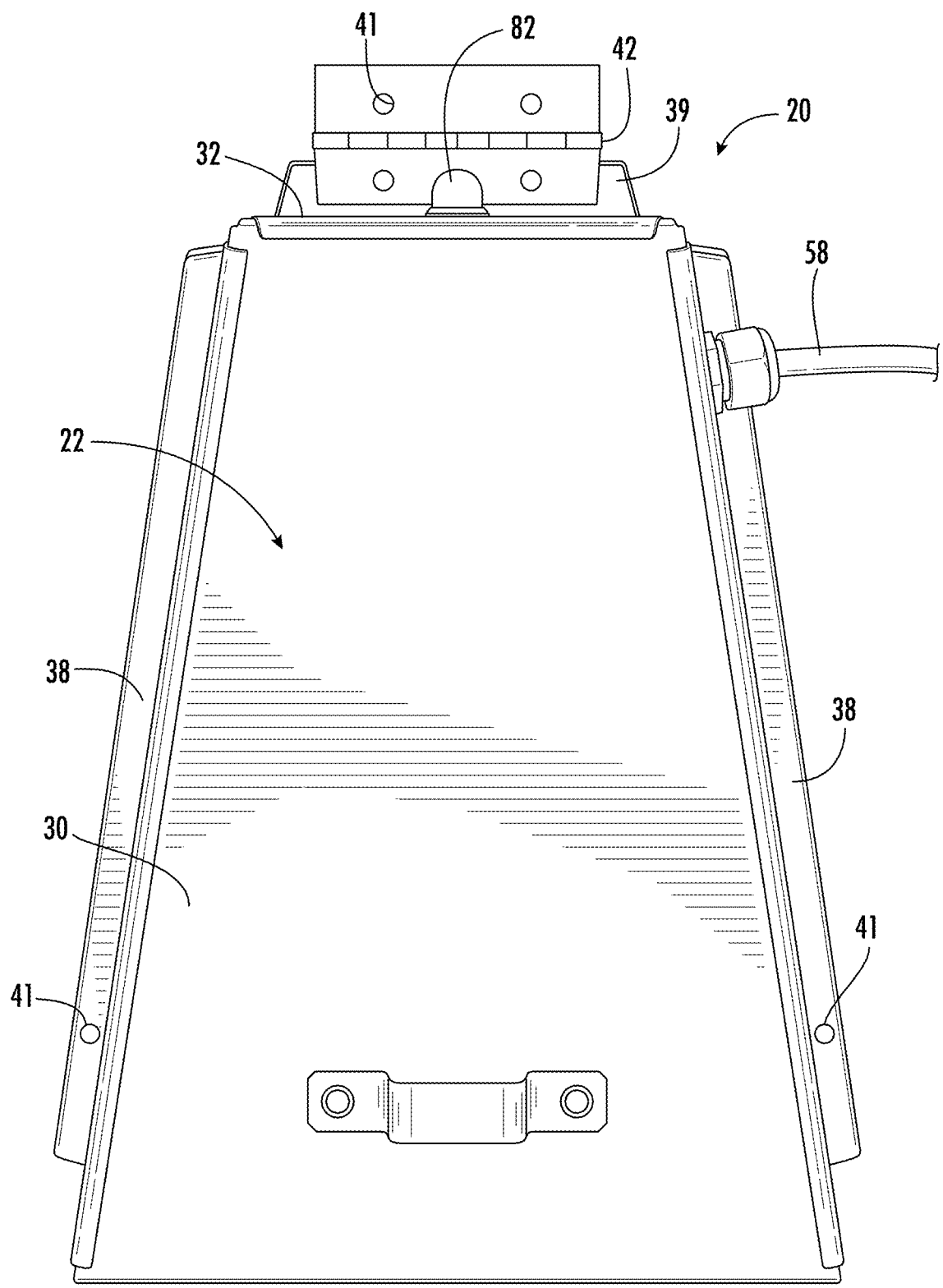
FIG. 2 is a front elevation view of the housing as shown in FIG. 1.
Figure 3:
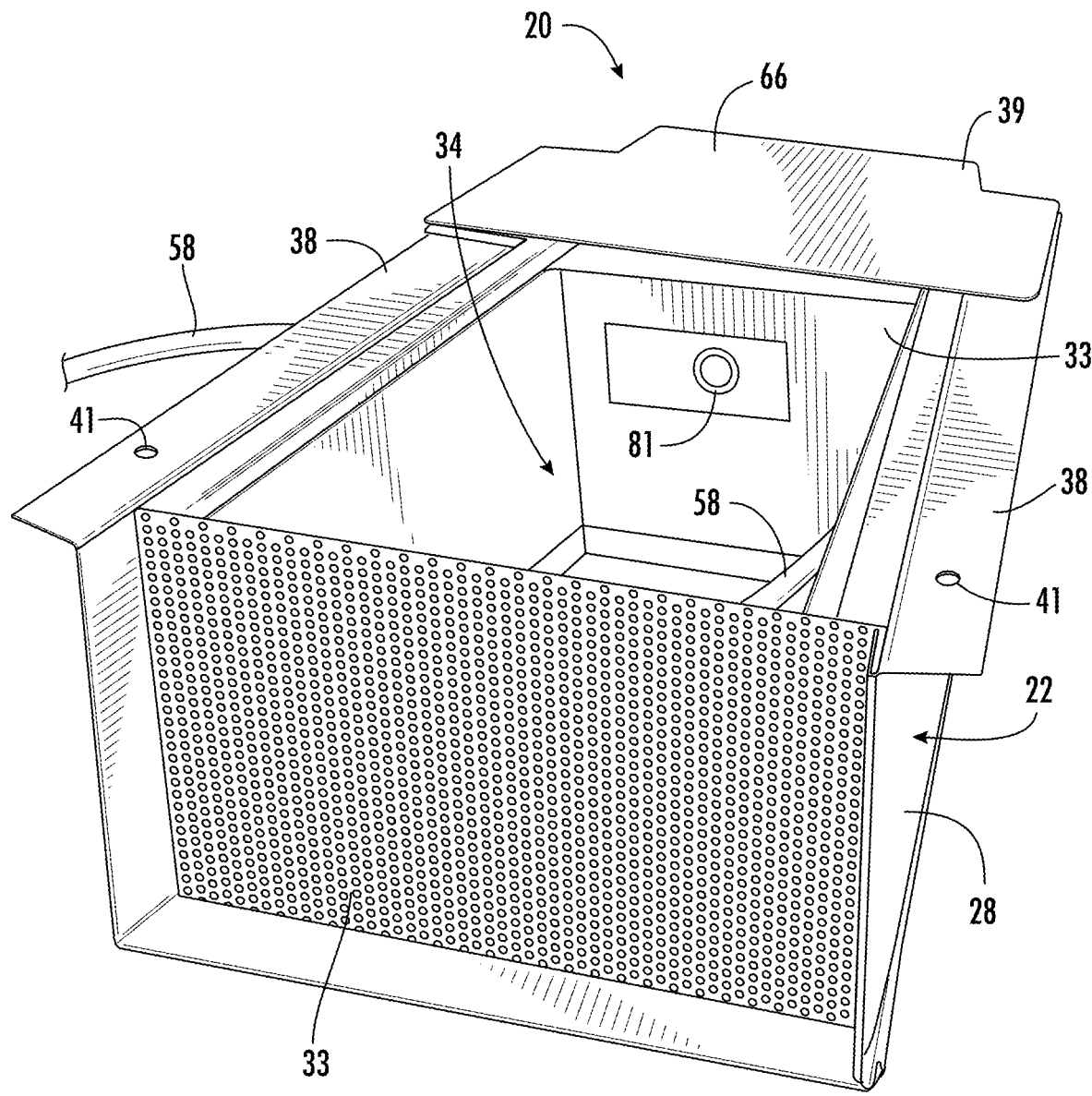
FIG. 3 is a bottom rear perspective view of the housing as shown in FIG. 1.
Figure 4:
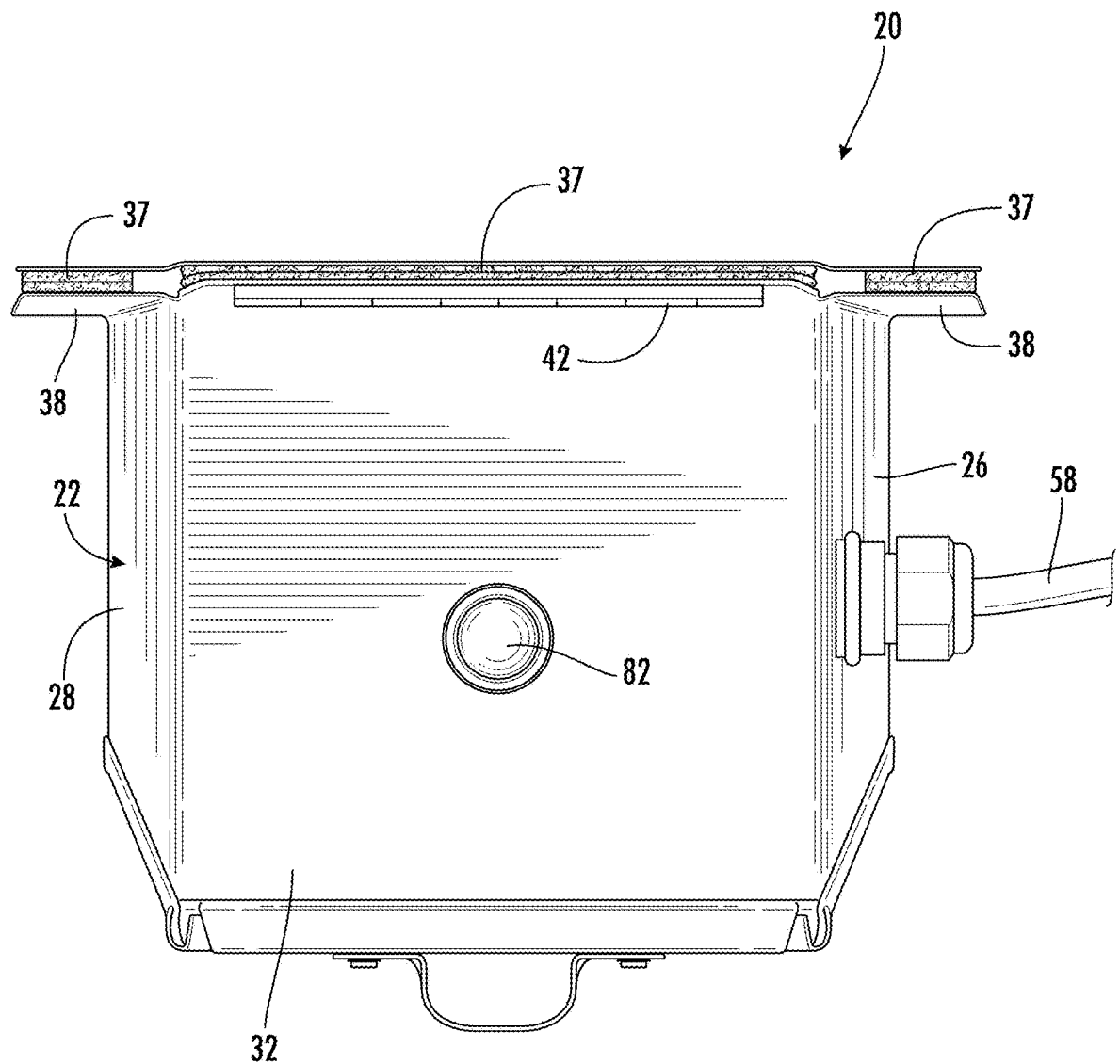
FIG. 4 is a top plan view of the housing as shown in FIG. 1.
Figure 5:
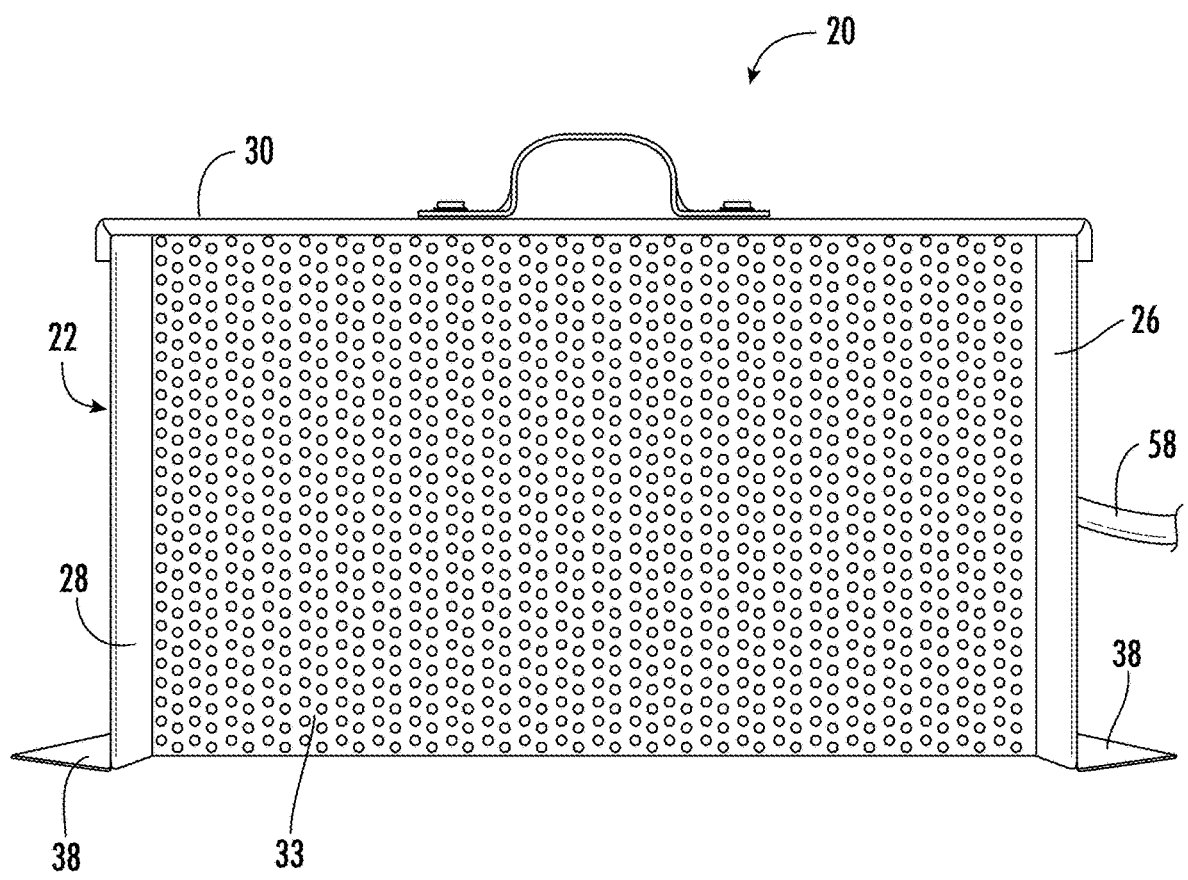
FIG. 5 is a bottom plan view of the housing as shown in FIG. 1.

Certain terminology is used herein for convenience only and is not to be taken as a limitation on the invention. For example, words such as "upper," "lower," "left," "right," "horizontal," "vertical," "upward," "transverse" and "downward" merely describe the configuration shown in the FIGS. Indeed, the components may be oriented in any direction and the terminology, therefore, should be understood as encompassing such variations unless specified otherwise.

Referring now to the drawings, wherein like reference numerals designate corresponding or similar elements throughout the several views, an embodiment of a housing assembly for accommodating a drain outlet is shown in FIGS. 1-10 and generally designated at 20. The housing assembly 20 comprises a housing 22 for accommodating a drain outlet and means for removably securing the housing 22 to a supporting surface 25, such as an exterior wall or a foundation of a house or to a furnace itself.

The housing 22 comprises a plurality of walls, including a right side wall 26 and a left side wall 28, a front wall 30, and a top wall 32 extending transversely between and interconnecting the side walls 26, 28 and the front wall 30. The plurality of walls 26, 28, 30, 32 extend generally continuously from their respective adjoining edges. In the configuration shown, the side walls 26, 28 and the front wall 30 taper outwardly from the top wall 32 to their distal edges. A perforated bottom wall 33 spans the side walls 26, 28 and the front wall 30 inwardly spaced from their distal edges. The housing 22 shown in FIGS. 1-10 defines a rear opening 34.

The walls 26, 28, 30, 32, 33 of the housing may be generally planar and may take on any shape, such as a substantially rectangular or rhomboid shape as shown. Preferably, the walls 26, 28, 30, 32, 33 are shaped so as to conform to the shape of the supporting surface 25 from which the housing 22 may be suspended. Each wall 26, 28, 30, 32, 33 includes an outwardly facing outer surface and an inwardly facing inner surface. The inner surfaces of the walls 26, 28, 30, 32, 33 at least partially define an interior chamber of the housing assembly 20, which is further defined by the support surface 25 to which the housing 22 is mounted. The walls 26, 28, 30, 32, 33 of the housing 22 may be fabricated from any material, including, but not limited to, any sheet metal, (e.g. steel, aluminum, galvanized metal, etc.), plastic, fiberglass, metal or any other type of rigid material. The material of the housing 22 should be able to withstand weather, as well as being hit, bumped or other damage typical around the house. While the housing 22 can be assembled by fastening the separate walls 26, 28, 30, 32 to one another (e.g., as by welding, L-bracket, fasteners, etc.), the housing 22 may be a single integral sheet folded along fold lines. It is understood that the housing 22 may be of any appropriate dimension for accommodating the drain outlet.

A heater box 60 is configured to be received within the interior chamber of the housing 22. In one embodiment, the heater box 60 is similarly shaped to the housing 22. As such, the heater box 60 comprises a plurality of walls, including a right side wall 62 and a left side wall 64, a front wall 66, and a top wall 68 extending transversely between and interconnecting the side walls 62, 64 and the front wall 66 along their edges. In the embodiment best shown in FIG. 8, the configuration of the heater box 60 is shorter than housing 22 while generally corresponding to the shape of the housing 22. Accordingly, the side walls 62, 64 and the front wall 66 of the heater box 60 taper outwardly from the top wall 68 to their distal edges and define an interior 70 opening to the rear. When the heater box is 60 is received within the housing 22, an electrical compartment is formed between the top wall 32 of the housing 22 and the top wall 68 of the heater box 60.

A single layer of foam insulation board 37 lines the inner surface of each of the walls of the housing 22, except for the perforated bottom wall 33. When assembled, the foam insulation panels 37 are sandwiched between the inner surface of each of the walls of the housing 22 and the outer surface of each of the walls of the heater box 60, except for the perforated bottom wall 33. The foam insulation panels 37 can be attached to the interior surface of the walls 26, 28, 30, 32 of the housing 22 using a standard, commercial-grade "brush-on" or "spray-on" construction adhesive. Suitable foam insulation boards or panels are about ⅜ inches thick and have an R-factor of at least about three (R-3). Other types of insulation may be used, including rotary liner insulation, attached with similar brush-on or spray-on aerosol adhesive or individual "weld-pins." The type and thickness of the insulation, whether foam panel board, spray-on foam, or rotary liner, may be selected as is suitable for the geographical area in which the housing assembly 20 is being used.

The mounting means 24 comprises side flanges 38, extending perpendicularly outwardly from the rear edge of each of the side walls 26, 28 and a top flange 39 extending perpendicularly outwardly from the rear edge of the top wall 32. Each of the side flanges 38 and the top flange 39 may have one or more openings 41 for receiving a fastener 40, e.g., bolts, rods, screws, hooks, nails, etc., for attaching the housing 22 to the support surface 25. The openings 41 may be of any shape, such as a round hole, a keyhole slot, eyelet-shape, etc.

The top flange 39 may comprise a hinge 42 for connecting the housing 22 via the top wall 32 to the support surface 25. One side of the hinge 42 is pivotally connected to a portion of the top wall 32 of the housing 22. The hinge 42 may be removeably fastened (e.g., by fasteners, screws, bolts, etc.) or may be permanently fixed (e.g., as by welding) to the top wall. The other side of the hinge 42 is connected to the support surface 25 (FIGS. 11 and 12), which allows the housing 22 to be rotated away from the support structure when necessary. Any of the side walls 26, 28 of the housing 22 may also comprise a hinge. It is understood that the mounting means 24, as shown and described herein, is not limited to the embodiments. Any other suitable means may be used for attaching the housing 22 to the supporting structure 25, including magnets and the like.

Figure 6:
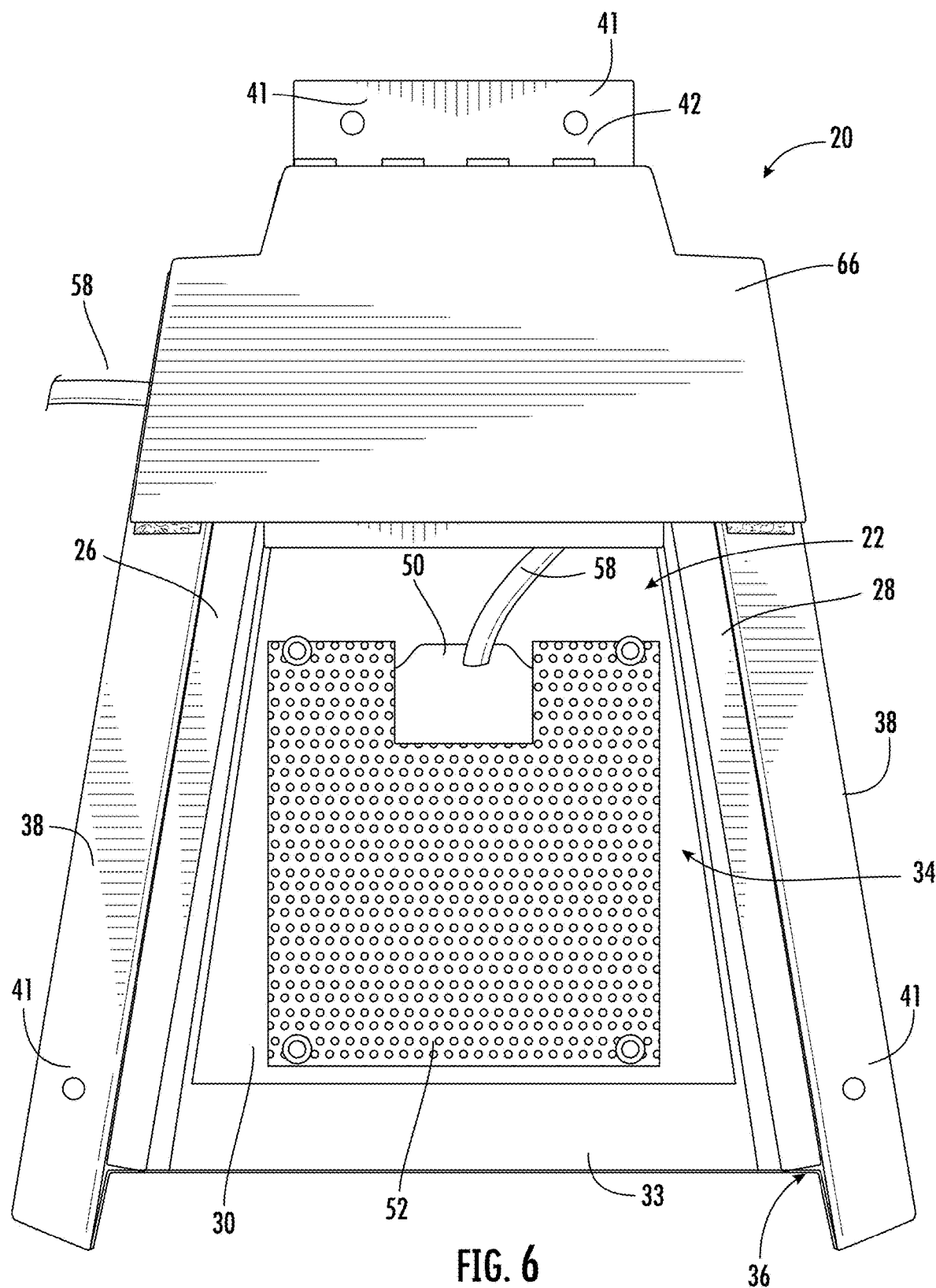
FIG. 6 is a rear elevation view of the housing as shown in FIG. 1.
Figure 7:
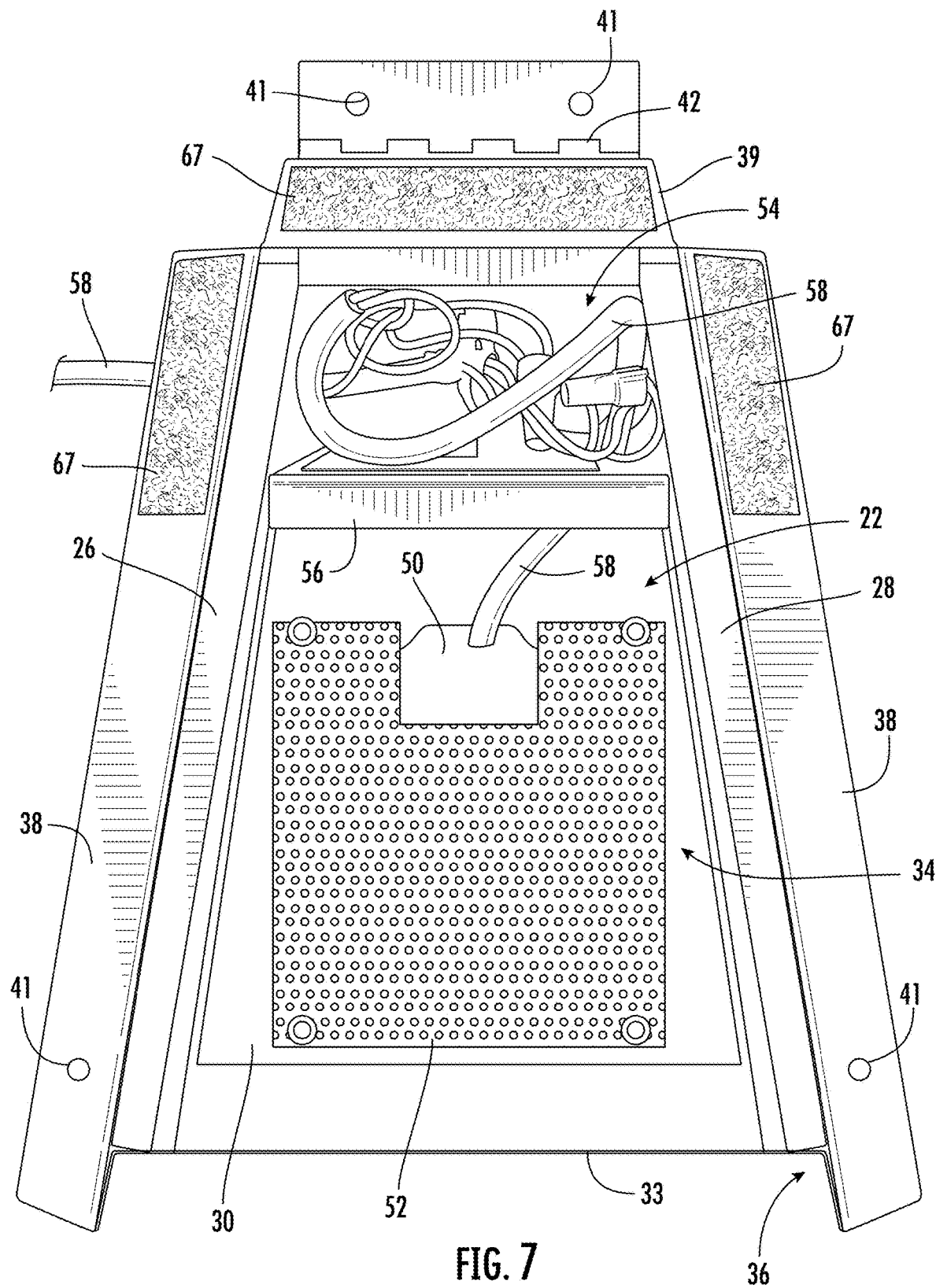
FIG. 7 is a rear elevation view of the housing with a cover removed exposing an inside of an electronics compartment.
Figure 8:
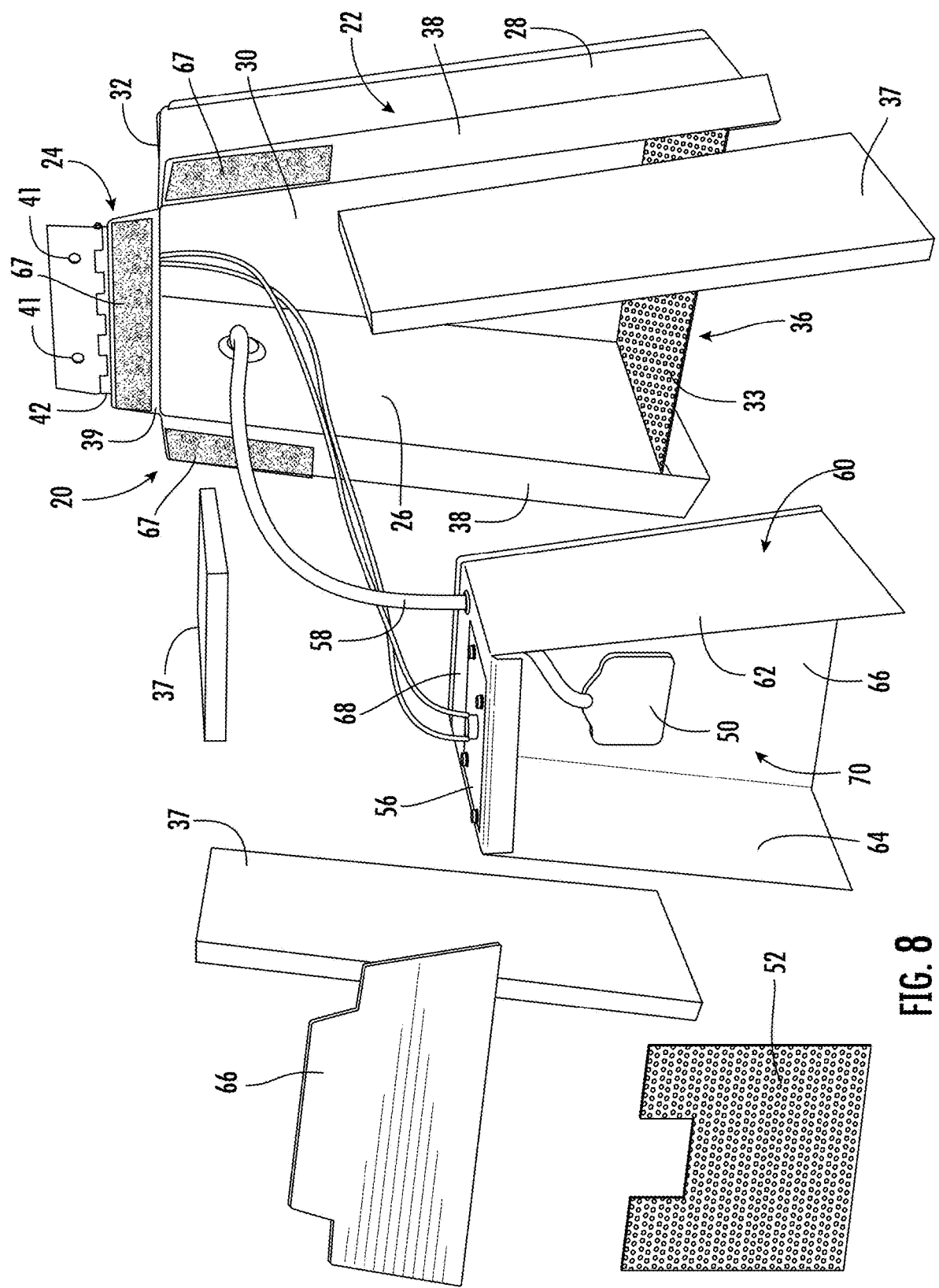
FIG. 8 is an exploded rear perspective view of the housing as shown in FIG. 1.
Figure 9:
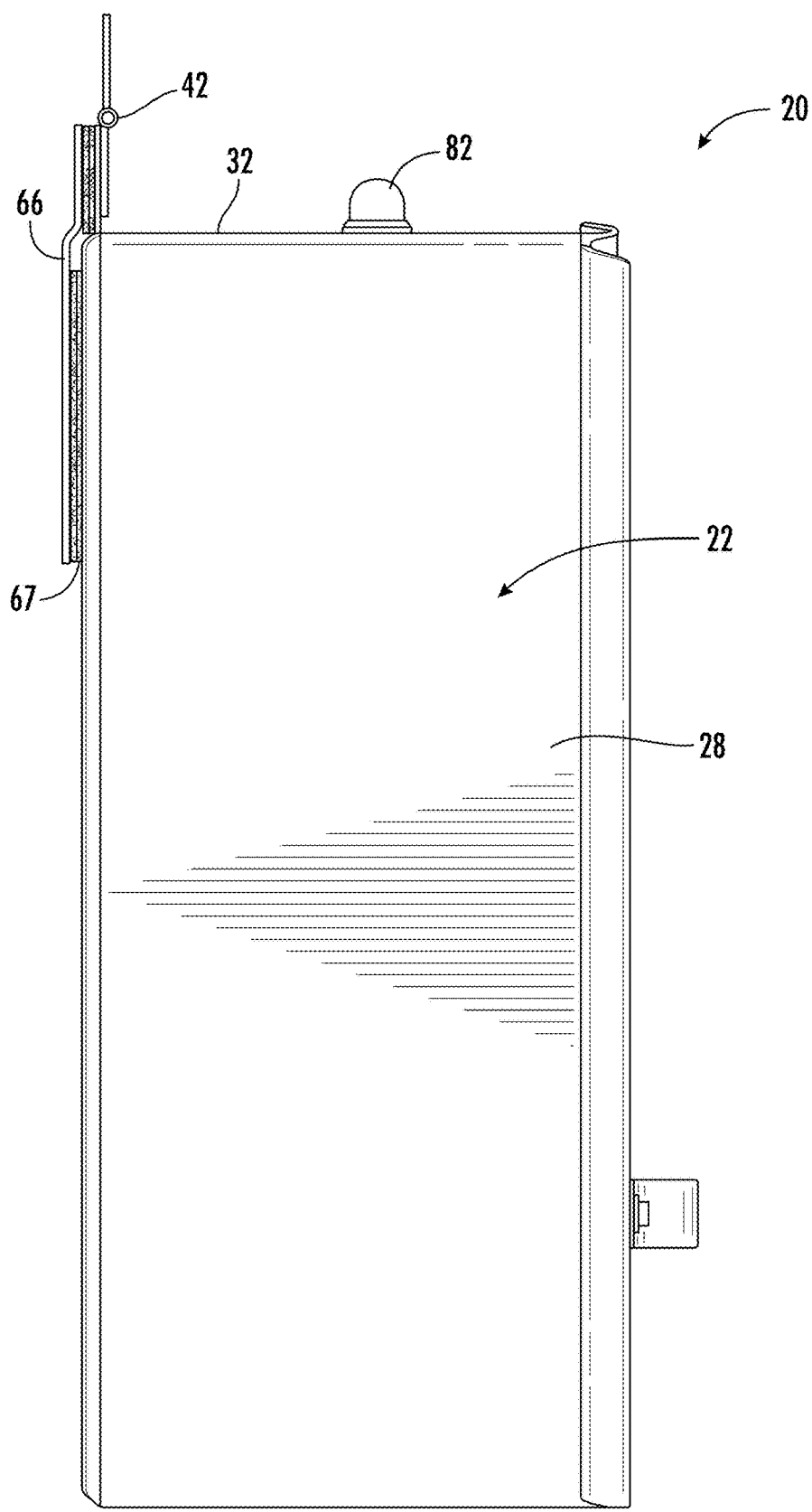
FIG. 9 is a right side elevation view of the housing as shown in FIG. 1.
Figure 10:
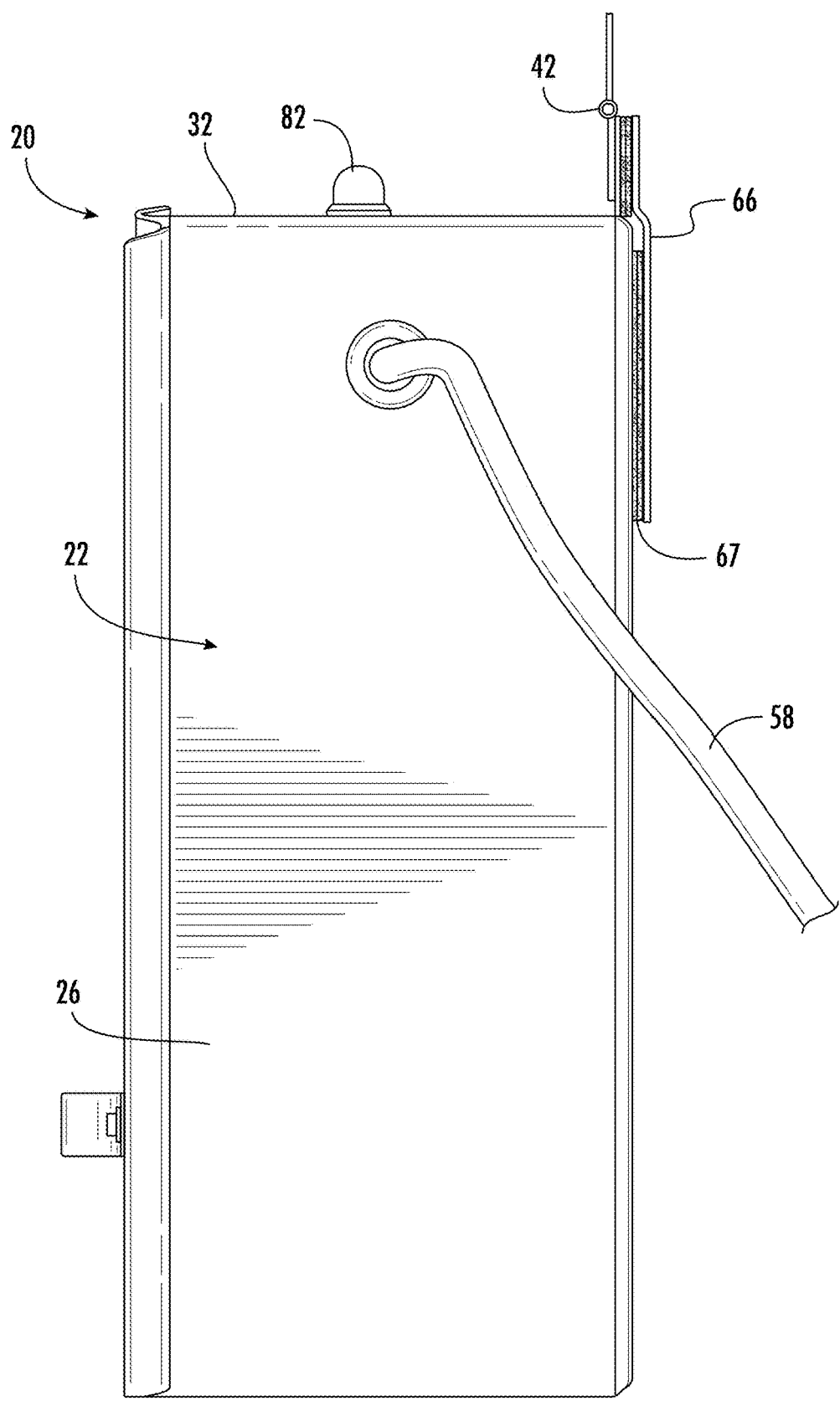
FIG. 10 is a left side elevation view of the housing as shown in FIG. 1.

Referring to FIGS. 6-8, an electric heater 50 is provided for delivering auxiliary heat when required by environmental conditions to prevent freezing of the condensate fluid from the condensing gas furnace. In one embodiment, the heater 50 comprises a silicone pad heater secured to the inner surface of the front wall 30 by a perforated metal cover 52 fastened to the front wall 30. The pad heater 50 is sandwiched between the front wall 30 and the cover 52. As best seen in FIG. 7, a compartment 54 for electronic components is formed between the top wall 32 of the housing 22 and the top wall 68 of the heater box 60. The latter provides a planar metal floor spanning the front wall 30 and side walls 26, 28 of the housing 22 spaced from the top wall 32. A standard three-wire prong plug and cord 58 provides electrical power to the housing 22. The cord 58 passes through the right side wall 26 of the housing 22 and into the compartment 54 for delivering the power to the electronic components. A planar compartment cover 66 is provided for enclosing the electronics components within the compartment 54. The cover 66 may be selectively removable (FIGS. 7 and 8) by adhering Velcro 67 to the flanges 38, 39 and the inner surface of the cover 66.

Figure 13:
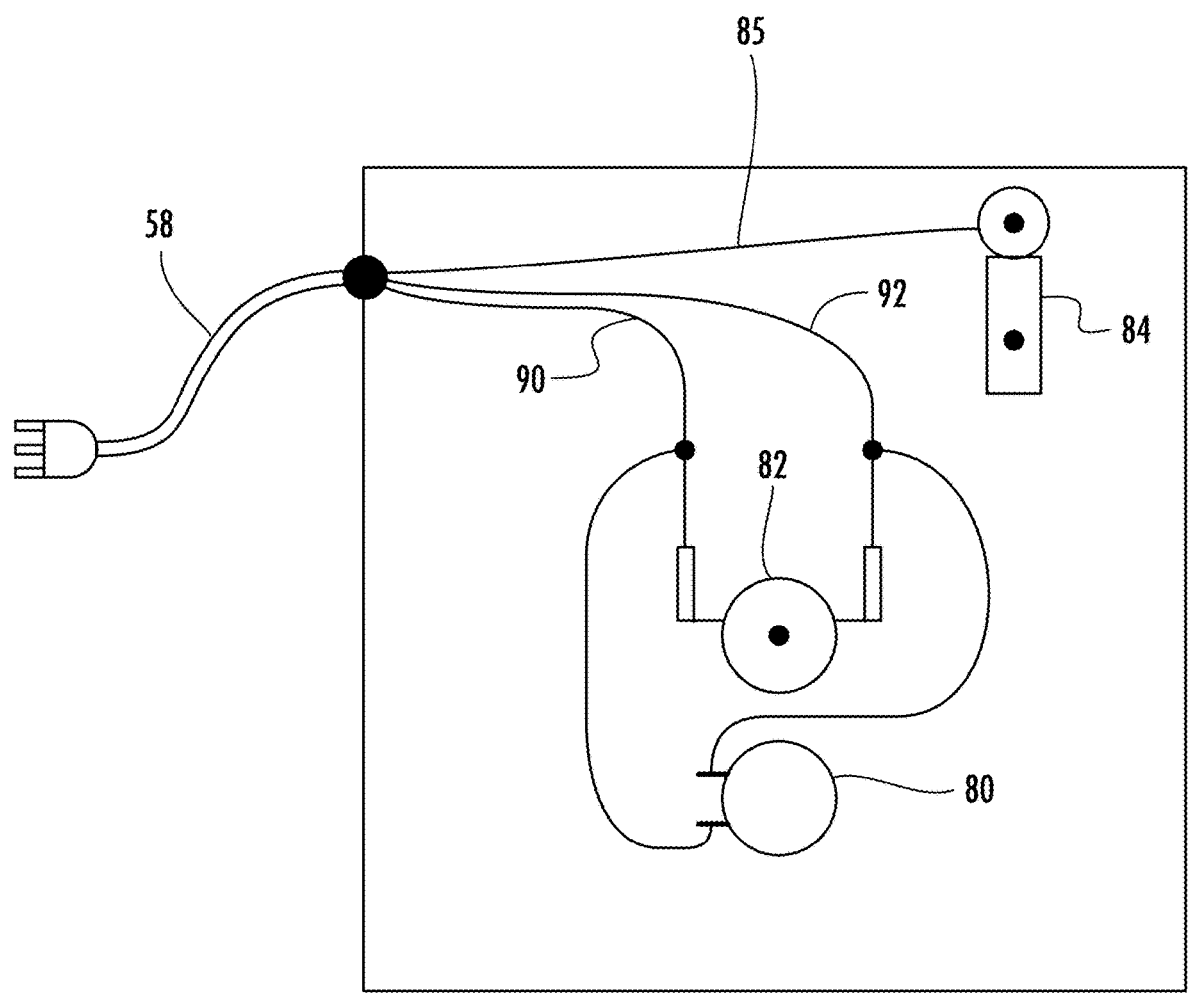
FIG. 13 is a schematic view of electrical wiring for powering auxiliary heat in the housing as shown in FIG. 1.

As shown in FIG. 13, the electronic components comprise a thermostat 80, an on/off indicator light 82 on the outer surface of the top wall 32 of the housing 22, and a ground plug 84. A hot wire 90 and a neutral wire 92 are each electrically connected to the thermostat 80 and the light 82. A ground wire 85 from the cord 58 is secured to the ground plug 84. The thermostat 80 functions to actuate the heater 50 for maintaining the interior of the housing 22 above the freezing temperature of the condensate fluid. In one embodiment, the heater 50 maintains the interior of the housing 22 at a temperature of between about 42 degrees and 80 degrees.

Figure 11:
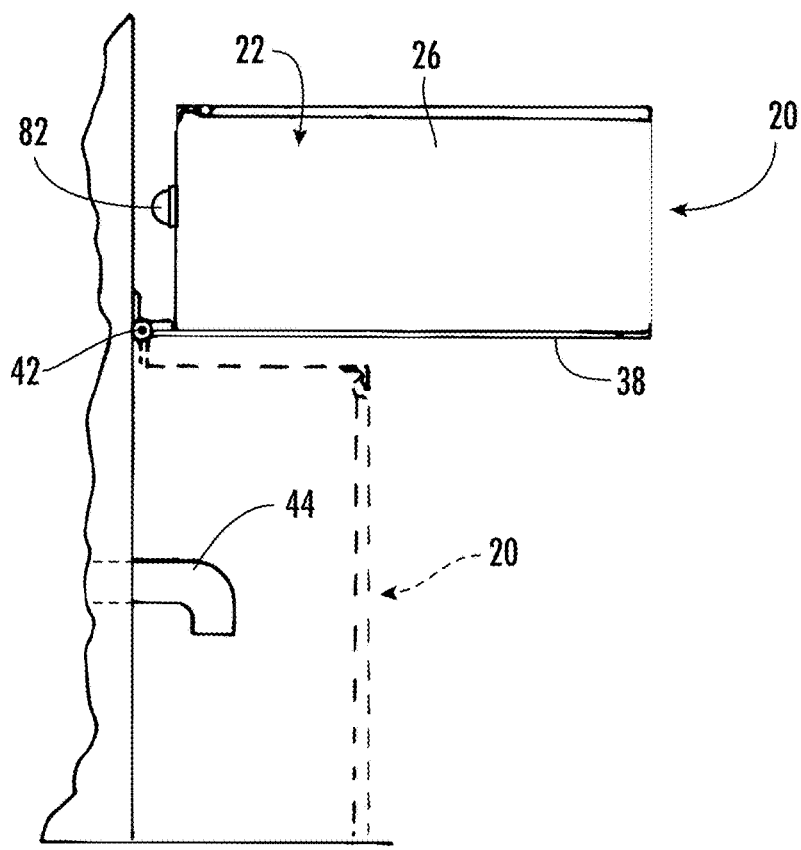
FIG. 11 is a side elevation view of the housing as shown in FIG. 1 installed on an exterior wall over a drain outlet in a first open position and a second closed position shown in phantom.
Figure 12:
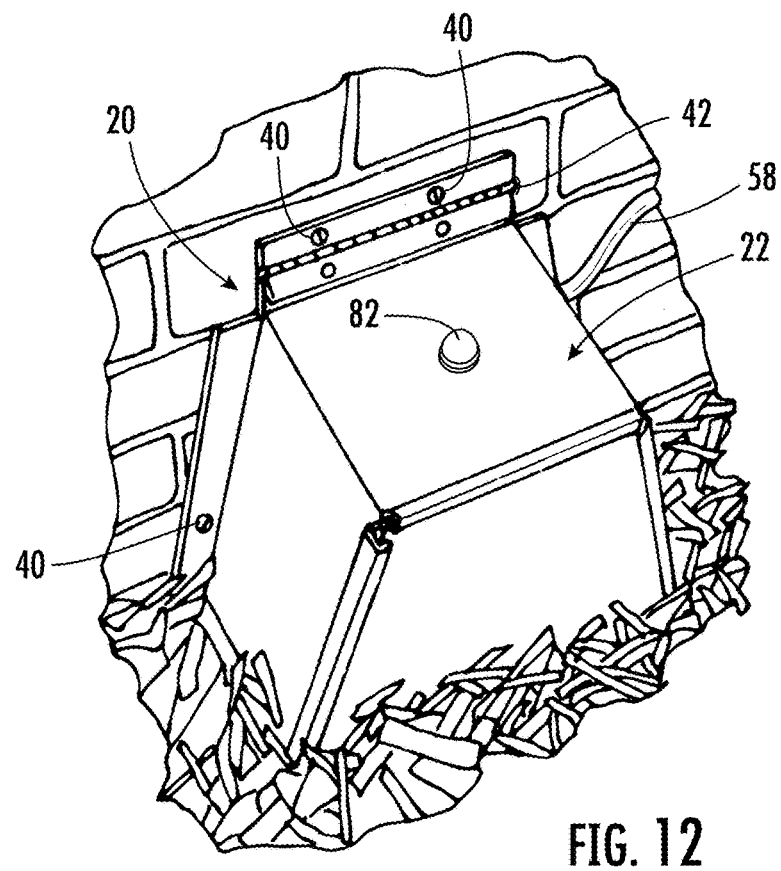
FIG. 12 is a top perspective view of the housing as shown in FIG. 1 installed on the exterior wall over the drain outlet as shown in FIG. 10.

In use, the housing assembly 20 is secured to a supporting structure 25 surrounding a drain outlet 44 (FIGS. 11 and 12). The housing 22 is positioned with the rear opening of the housing 22 adjacent to the support surface 25 such that each flange 38, 39 of the mounting means 24 engages the support surface 25. Fasteners 40 are inserted through the holes 41 in the flanges 38, 39 and into the support surface 25, as shown. This effectively mounts the housing 22 to the support surface 25, which abuts against the rear edges of the side walls 26, 28, the top wall 30 and the flanges 38. The housing 22 is shown resting on the ground for further supporting the weight of the housing. However, it is understood that the housing may be suspended above the ground, depending upon where the drain outlet exits the support surface 25 structure. The interior chamber defined between the surface of the supporting 25 surface and the inner surfaces of the walls 62, 64, 66, 68 of the heater box 60 accommodates the drain outlet 44. The extension of the side walls 62, 64 from the support surface 42 determines the depth of the interior chamber defined by the heater box 60. The internal space is at least large enough for receiving the drain outlet. As best seen in FIG. 11 in phantom, the internal space is not accessible via the rear opening 24 or the bottom opening 36 of the housing 22, the former being covered by the support surface 25 and the latter being closed to the ground (FIG. 11) when the housing 22 contacts the ground. When the drain outlet 44 is covered, the fluid will run from the drain outlet 44 to the ground. The thermostatically controlled heater 50 will maintain the interior chamber above freezing temperatures to prevent risk of freezing of the condensate fluid under frigid conditions. Mounting the housing 22 around the drain outlet 44 provides an insulated, heated internal space to protect the drain outlet 44 and prevent freezing of the draining fluid.

At any time, such as for maintenance, replacement, upgrades, etc., the housing 22 may be detached from the support surface 25 via the mounting means 24, as previously described with regard to FIGS. 11 and 12. Allowing the housing assembly 20 to be easily and quickly removed from the support surface 25 gives free access to the housing 22 of the drain outlet 44 for performing various operations after installation, such as performing repair work, upgrading systems or maintenance or replacing the housing altogether.

FIG. 11 shows one drain outlet 44; however, it should be understood that the housing 22 may accommodate more or less outlets than what is shown. In the embodiments shown, the drain outlet 44 is representative of a drain outlet for a condensing furnace. As shown in FIG. 12, the housing assembly 20 allows mulch to be placed over the top of the drain line, further restricting wind or extreme temps from accessing the drain outlet. The housing assembly 20 also prevents insects, such as wasps, from colonizing the end of the drain outlet, thus blocking the flow of condensate, and again cutting the HVAC system off. The housing assembly 20 also prevents rodents such as squirrels from gnawing away the exposed portion of the drain outline, which would allow the condensate to run into the exterior wall cavities rather than to the exterior. Protecting the (typically plastic and somewhat fragile) exposed drain outlet from damage from mowers, weed eating, and prevention of mulching and annual re-mulching from clogging up end of condensate drain outlet is also a benefit of the drain housing.

Figure 14:
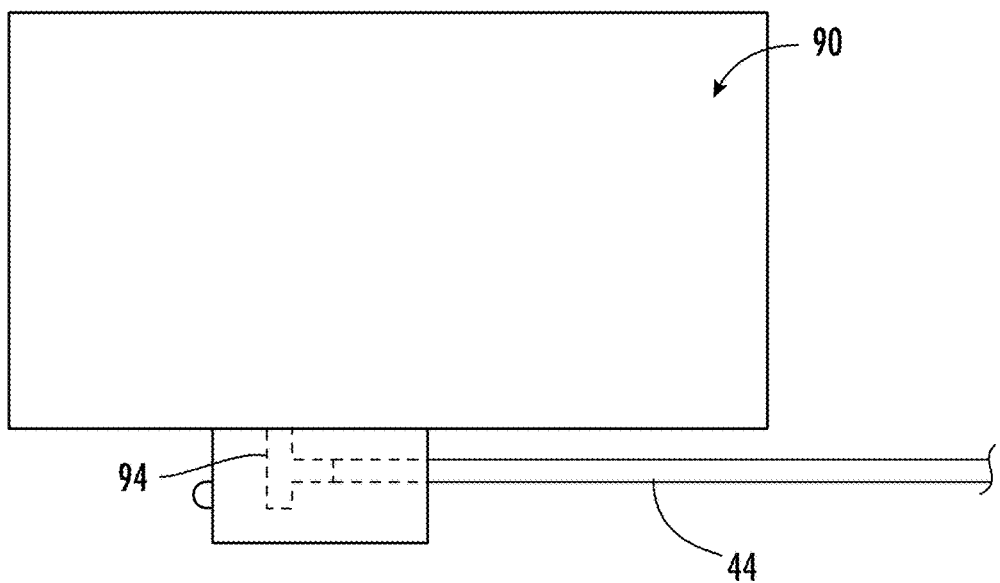
FIG. 14 is a schematic view of another embodiment of a housing for accommodating a drain trap installed at a trap location for a horizontal condensing gas furnace.
Figure 15:
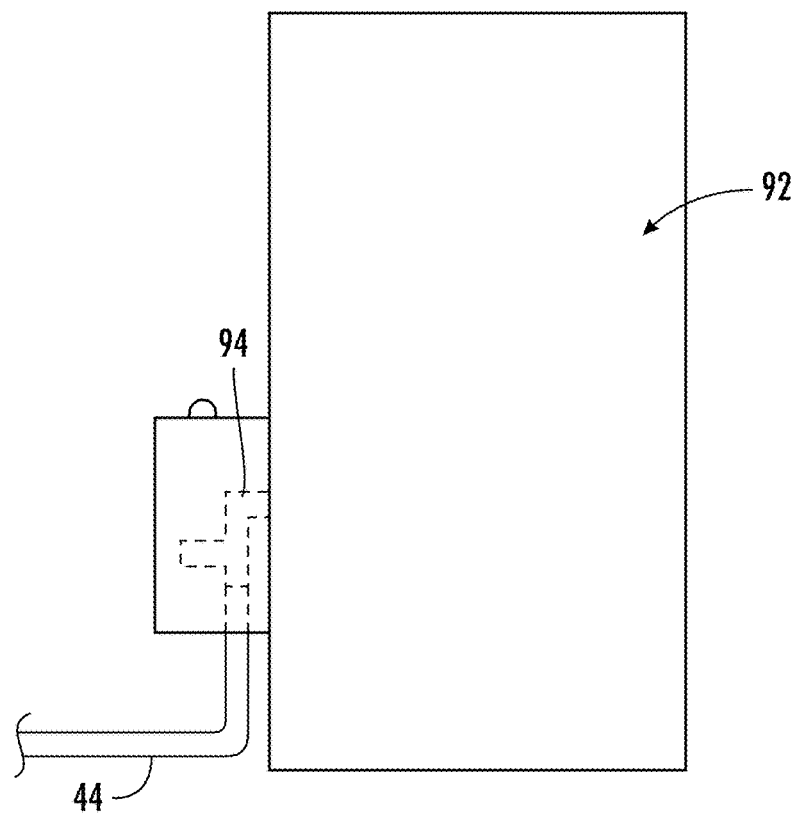
FIG. 15 is a schematic view of the housing as shown in FIG. 14 installed at a trap location for a vertical condensing gas furnace.

The housing assembly 20 may be used in cooperation with other locations of a condensing gas furnace. In one embodiment, shown in FIGS. 14 and 15, the housing assembly 20 may protect fluid from freezing in a trap location 94 of a condensing gas furnace. The trap 94 in a condensing gas furnace serves as the primary evacuation device for removing condensate from the furnace. A trap 94 location for a horizontal condensing gas furnace 90 and a trap location for a vertical condensing gas furnace 92 are shown in FIGS. 14 and 15, respectively. The housing assembly 20 may be used to surround the trap 94 below the horizontal furnace 90 or the trap 94 on the side of the vertical furnace 92 to prevent condensate fluid from freezing.

Figure 16:
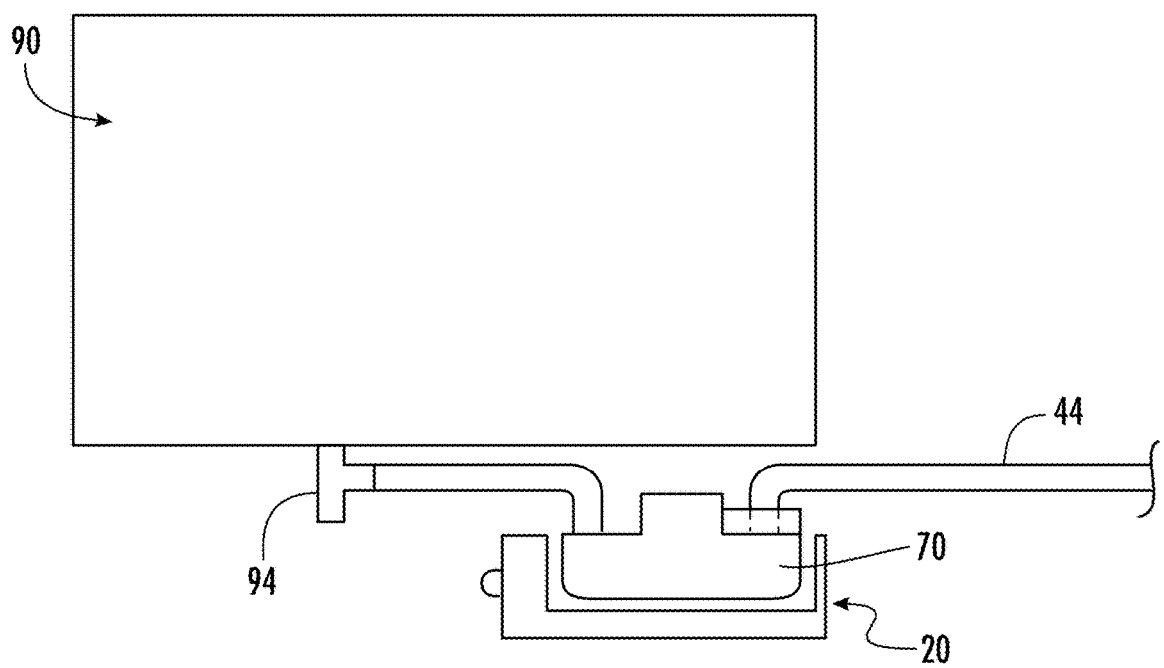
FIG. 16 is a schematic view of a third embodiment of a housing for accommodating a condensate fluid pump installed as a heated compartment for a condensate fluid pump of a condensing gas furnace.
Figure 17:
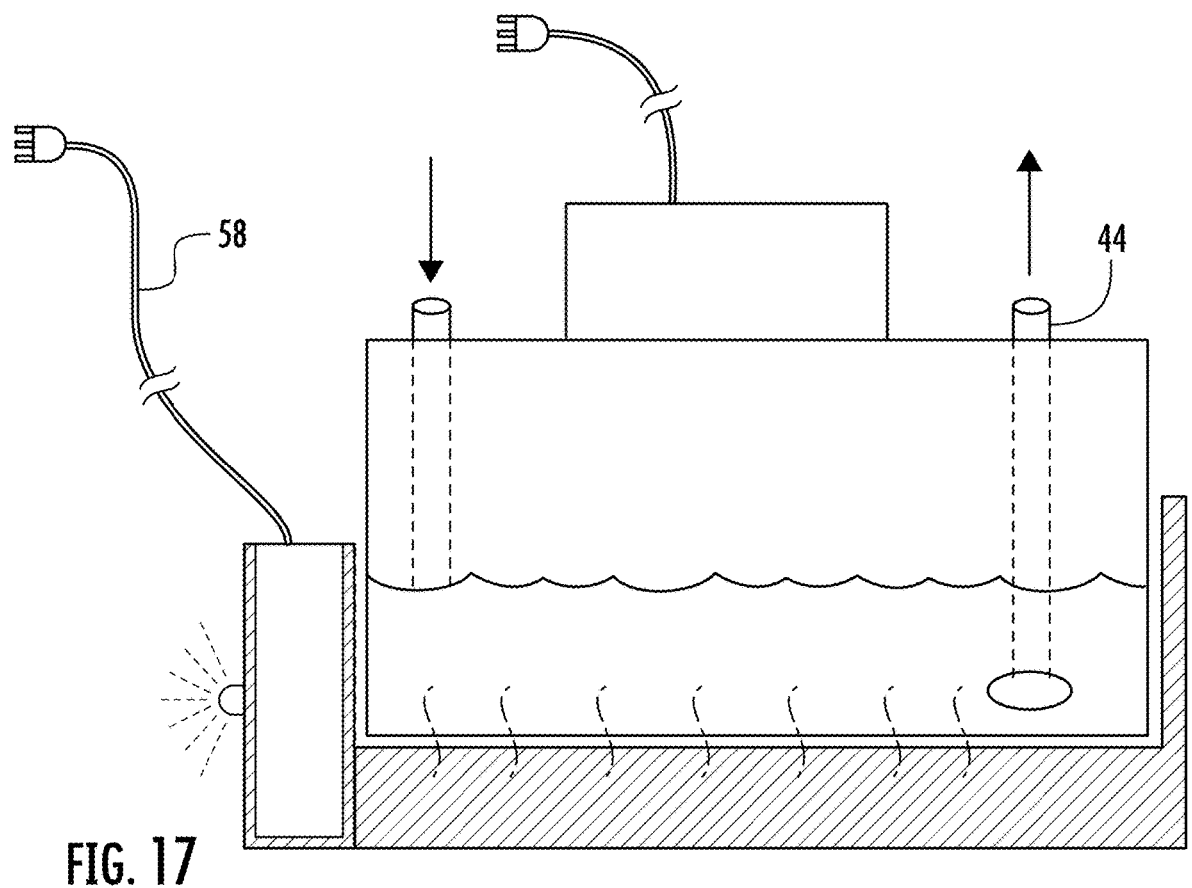
FIG. 17 is a schematic side elevation view of an assembly including the housing as shown in FIG. 16 with the compartment for receiving a portion of the condensate fluid pump.
Figure 18:
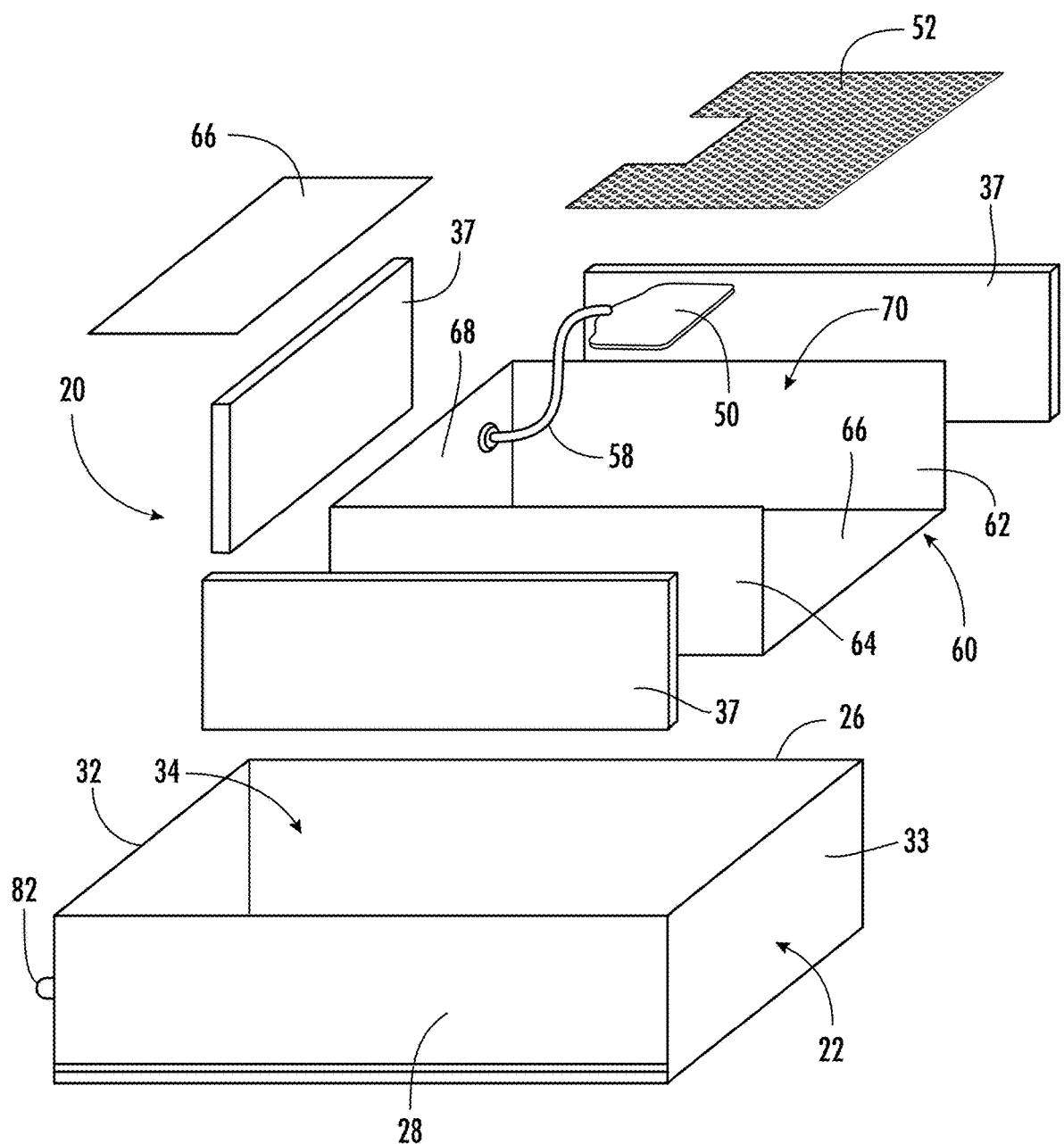
FIG. 18 is an exploded side perspective view of the housing assembly as shown in FIG. 17.

A condensing gas furnace 90 may also have a condensate pump assembly 70 (FIGS. 16 and 17) to pump liquid from where the furnace is located in a building to outside of the building. An embodiment of the present housing assembly 20 can be used to prevent fluid in the condensate pump assembly 70 from freezing. FIG. 16 shows the relative position of a condensate pump assembly 70 below the horizontal condensing gas furnace 90. A close-up view of the condensate pump assembly 70 received within the heating assembly 20 is shown in FIG. 17. The housing assembly 20 for this application is shown in FIG. 18. The housing assembly 20 generally comprises all of the same components as the first embodiment (FIGS. 1-10), but is configured in a generally rectangular shape to correspond to the shape of the condensing pump assembly 70. The heater box 60 is sized to receive the pump assembly 70 such that it is substantially enclosed within the heater box 60. More specifically, the condensate pump assembly 70 preferably slides freely into and out of the heater box 60 within the housing 22. The pump assembly 70 is designed to sit within the housing without contacting the heater 50 on the bottom wall 66 of the heater box 60. The heater 50 is held by the heater cover 52 below and slightly spaced from the condensate pump assembly 70.

Figure 19:
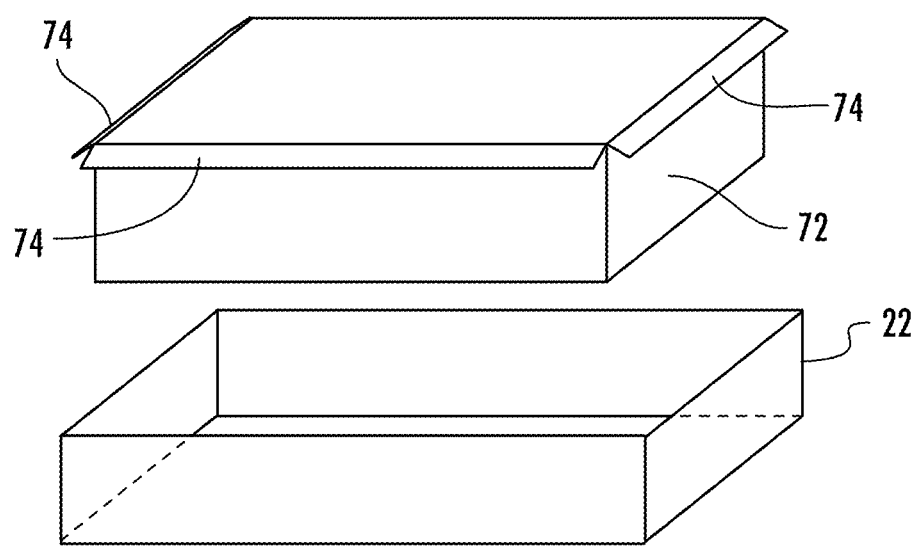
FIG. 19 is a partially exploded side perspective view of another embodiment of a housing for receiving a condensate fluid pump as shown in FIG. 16 including a drop-in metal sleeve for supporting the pump assembly.

Referring to FIG. 19, another embodiment for use with the condensate pump assembly 70 comprises an uninsulated inner metal box 72 configured to receive the condensate pump 70. The inner box 72 defines a galvanized metal compartment serving multiple purposes, including accommodating all electrical components and connections, as well as supporting the silicone patch heater 50 and porous heater cover 52. The inner box 72 has outwardly extending flanges 74 along its upper edges. The box 72 is sized to slide into and out of the housing 22. When the box is received within the housing 22, the flanges 74 overhang the edges of the walls of the housing 22 such that the box 72 and pump assembly 70 are suspended above and spaced from the heater 50. In this arrangement, the box 72 can be configured to fit into or around most furnace locations as needed. A conventional fastener, such as a screw, may be used to secure the box in the selected position. When the box 72 is in position, the condensate pump assembly 70 or other furnace component or fluid location, such as a trap, is protected against freezing. A PVC drain line 44 (not shown) may exit the box 72 or the housing 22 for carrying fluid away. A similar "slide-in" arrangement would be suitable in other furnace locations.

Although the present invention has been shown and described in considerable detail with respect to only a few exemplary embodiments thereof, it should be understood by those skilled in the art that it is not intended to limit the invention to the embodiments since various modifications, omissions and additions may be made to the disclosed embodiments without materially departing from the novel teachings and advantages of the invention, particularly in light of the foregoing teachings.

I claim:

1. An apparatus for protecting from freezing fluid flowing from a conduit outlet above ground level on an exterior wall of a building, the freeze protection apparatus comprising: (a)

a condensing gas furnace providing a continuous flow of condensate fluid through the conduit outlet; (b) a heater box having a longitudinal dimension, the heater box including a top wall, a front wall, and a plurality of side walls interconnecting the top wall and the front wall, wherein the heater box partially defines an enclosed area sized for covering the conduit outlet and having a rear aperture and a bottom aperture; (c) a housing adapted for receiving the heater box, the housing including a top wall, having an interior surface and an inner edge, a front wall having an interior surface, a bottom edge, and a lateral dimension, and, a pair of opposed side walls, each side wall having an interior surface, an inner edge, a bottom edge and a depth dimension, the side walls interconnecting the top wall and the front wall, wherein the housing has a longitudinal dimension greater than the longitudinal dimension of the heater box and partially defines an enclosed area having openings at a rear aperture for passing the heater box; (d) thermal insulating material lining the interior surface of the walls of the housing; (e) a thermostatically controlled electric heater mounted to the heater box for maintaining the enclosed area of the heater box above freezing temperature to prevent the condensate fluid from freezing; and (f) means for mounting the housing to the exterior wall adjacent the conduit outlet, wherein heat is retained within the heater box to prevent fluid within the conduit outlet from freezing.

2. The freeze protection apparatus as recited in claim 1, further comprising a bottom wall spanning the side walls and the front wall inwardly longitudinally spaced from distal edges of the side walls and the front wall.

3. The freeze protection apparatus as recited in claim 2, wherein the bottom wall is perforated to allow fluid to pass through.

4. The freeze protection apparatus as recited in claim 1, wherein the electric heater comprises a silicone pad heater.

5. The freeze protection apparatus as recited in claim 1, wherein the inner edges of the side walls and the top wall of the housing contact the exterior wall.

6. The freeze protection apparatus as recited in claim 5, wherein the bottom edges of the side walls and the front wall are configured to contact the ground at ground level below the conduit outlet for enclosing the conduit outlet within the enclosed area defined by the heater box, the exterior wall and the ground level.

7. The freeze protection apparatus as recited in claim 1, wherein the mounting means comprises flanges at the inner edges of the side wall and the top wall of the housing.

8. The freeze protection apparatus as recited in claim 1, wherein the mounting means comprises a hinge for hingedly securing the housing to the exterior wall for pivoting movement between an open position away from the conduit outlet and a closed position enclosing the conduit outlet.

9. The freeze protection apparatus as recited in claim 8, wherein the pivot axis of the housing is about a substantially horizontal axis.

10. An apparatus for protecting from freezing fluid flowing from a condensing gas furnace providing a continuous flow of condensate fluid through a trap, the freeze protection apparatus comprising: (a) a heater box having a longitudinal dimension, the heater box including a top wall, a front wall, and a plurality of side walls interconnecting the top wall and the front wall, wherein the heater box partially defines an enclosed area and having a rear aperture and a bottom aperture for receiving the trap into the enclosed area; (b) a housing adapted for receiving the heater box, the housing including a top wall having an interior surface and an inner edge, a front wall having an interior surface, a bottom edge and a lateral dimension, and a plurality of side walls, each side wall having an interior surface, an inner edge, a bottom edge and a depth dimension, the side walls interconnecting the top wall and the front wall, wherein the housing partially defines an enclosed area having openings at a rear aperture and a bottom aperture, and wherein the area of the bottom aperture defined by the lateral dimension of the front wall and the depth dimension of the side walls is configured for receiving the heater box; (c) thermal insulating material lining the interior surface of the walls of the housing; (d) a thermostatically controlled electric heater mounted to the heater box for maintaining the temperature of the enclosed area of the heater box above freezing temperature to prevent the condensate fluid from freezing; and (e) means for mounting the housing to the furnace adjacent the trap, wherein the inner edges of the side walls and the top wall of the housing contact the furnace for enclosing the trap within an enclosed space defined by the heater box, and wherein heat is retained within the heater box to prevent the condensate fluid from freezing.

11. The freeze protection apparatus as recited in claim 10, further comprising a bottom wall spanning the side walls and the front wall inwardly longitudinally spaced from their distal edges.

12. The freeze protection apparatus as recited in claim 11, wherein the bottom wall is perforated to allow fluid to pass through.

13. The freeze protection apparatus as recited in claim 10, wherein the heater comprises a silicone pad heater.

14. The freeze protection apparatus as recited in claim 10, further comprising flanges at the inner edges of the side wall and the top wall.

15. The freeze protection apparatus as recited in claim 10, further comprising a hinge for hingedly securing the housing to an exterior wall of the furnace for pivoting movement between an open position away from the trap and a closed position enclosing the trap.

16. The freeze protection apparatus as recited in claim 15, wherein the pivot axis of the housing is about a substantially horizontal axis.

\* \* \* \* \*